US012562396B2

(12) United States Patent (10) Patent No.: US 12,562,396 B2
Kakuta (45) Date of Patent: Feb. 24, 2026

(54) FUEL CELL SYSTEM STRUCTURE

(71) Applicant: Honda Motor Co., Ltd., Tokyo (JP)

(72) Inventor: Kohei Kakuta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 606 days.

(21) Appl. No.: 18/076,398

(22) Filed: Dec. 7, 2022

(65) Prior Publication Data

US 2023/0178786 A1 Jun. 8, 2023

(30) Foreign Application Priority Data

Dec. 8, 2021 (CN) .......................... 202123070618.X

(51) Int. Cl.
H01M 8/2475 (2016.01)
H01M 8/248 (2016.01)
(52) U.S. Cl.
CPC ......... H01M 8/2475 (2013.01); H01M 8/248 (2013.01); H01M 2250/20 (2013.01)
(58) Field of Classification Search
CPC . H01M 8/2475; H01M 8/248; H01M 2250/20
USPC ........................................................ 429/452
See application file for complete search history.

(56) References Cited

U.S. PATENT DOCUMENTS

| | | | |
|---|---|---|---|
| 9,755,263 B2* | 9/2017 | Trevisan | H01M 8/04313 |
| 2010/0092839 A1* | 4/2010 | Kaupert | H01M 8/2475 |
| | | | 429/470 |
| 2014/0272662 A1* | 9/2014 | Rock | H01M 8/2475 |
| | | | 429/468 |
| 2015/0037702 A1* | 2/2015 | Osada | H01M 8/2465 |
| | | | 429/452 |
| 2016/0141700 A1* | 5/2016 | Takeyama | H01M 8/2475 |
| | | | 429/470 |
| 2018/0083301 A1* | 3/2018 | Morinaga | H01M 8/2475 |
| 2018/0309150 A1* | 10/2018 | Sumikawa | H01M 8/04953 |

FOREIGN PATENT DOCUMENTS

JP 2018133249 8/2018

* cited by examiner

*Primary Examiner* — James M Erwin
(74) *Attorney, Agent, or Firm* — JCIPRNET

(57) ABSTRACT

A fuel cell system structure includes: a fuel cell driving system including a fuel cell case for accommodating a fuel cell stack and a driving unit for driving a target to be driven; and a connecting member connecting the fuel cell case and the driving unit. The fuel cell case includes an extended part extending from a surface facing the connecting member, and the extended part is fixed on the connecting member.

5 Claims, 5 Drawing Sheets

10

$111 \begin{cases} 111a \\ 111b \end{cases}$ $111 \begin{cases} 111a \\ 111b \end{cases}$

1

FUEL CELL SYSTEM STRUCTURE

CROSS-REFERENCE TO RELATED APPLICATION

This application claims the priority benefit of Chinese application no. 202123070618.X, filed on Dec. 8, 2021. The entirety of the above-mentioned patent application is hereby incorporated by reference herein and made a part of this specification.

BACKGROUND

Technical Field

The disclosure relates to a fuel cell system structure.

Description of Related Art

Related Art Document 1 (Japanese Patent Application No. 2017-027047) discloses a structure fixing a fuel cell stack above a drive motor through a bracket. Specifically, in this fixed structure in Related Art Document 1, a bracket extending from a driving unit (DU) that is formed by a drive motor and a transmission device is bolted together with a mounting base disposed on an end plate. However, in the circumstances of the related art, a bottom surface of the end plate is required to have a flat shape, and a certain space is required in response to the requirements for disposing other members. For example, since the fuel cell stack requires a space for laying pipes for flowing gases or refrigerants, wires for power lines, or the like, further improvement to the detailed structure of the fixing structure is necessary to improve the layout flexibility of the pipes and wires and respond to the requirements of different fuel cell stacks.

SUMMARY

An embodiment of the disclosure provides a fuel cell system structure. The fuel cell system structure includes a fuel cell driving system which includes: a fuel cell case for accommodating a fuel cell stack and a driving unit for driving a target to be driven; and a connecting member connecting the fuel cell case and the driving unit. The fuel cell case includes an extended part extending from a surface facing the connecting member, and the extended part is fixed on the connecting member.

2

Figure 1A:
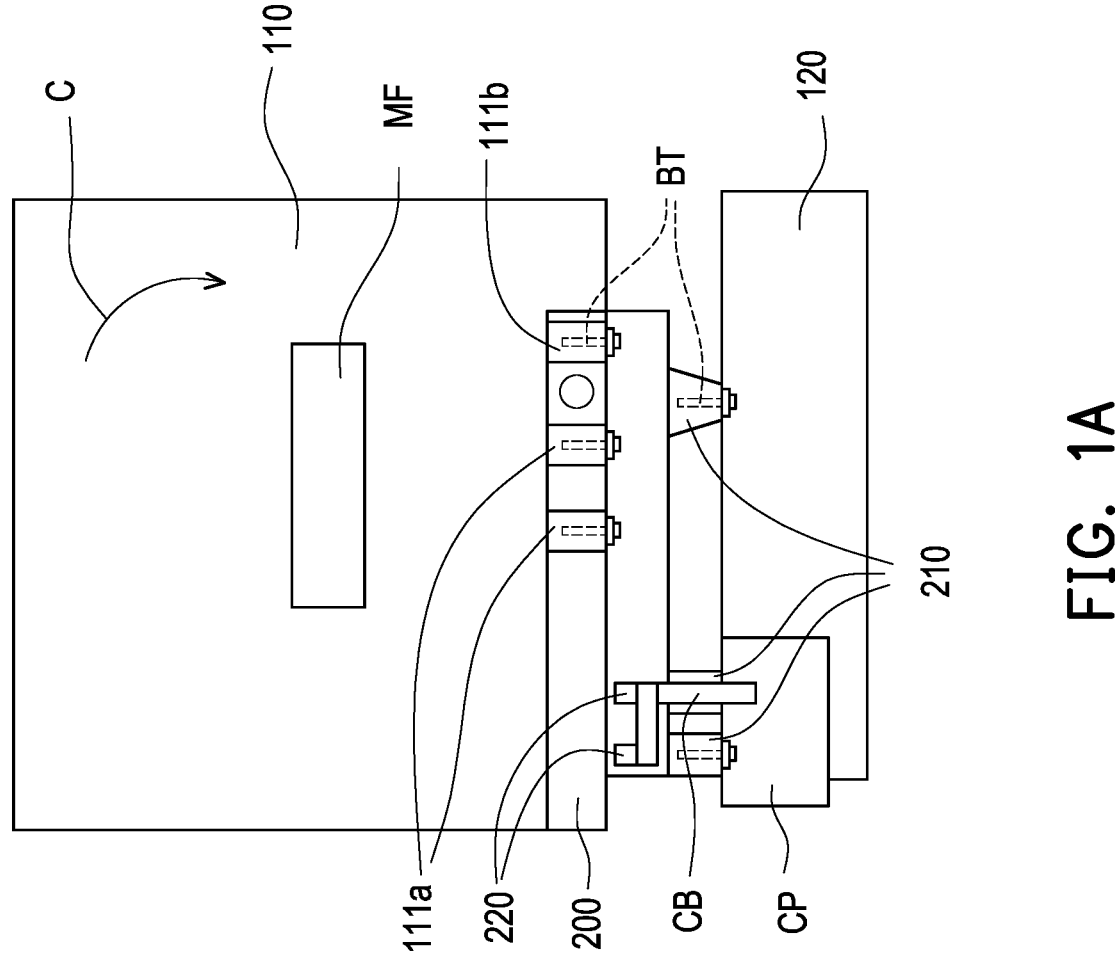
FIG. 1A is a schematic outline of a fuel cell system structure viewed from one side according to an embodiment of the disclosure.
Figure 5:
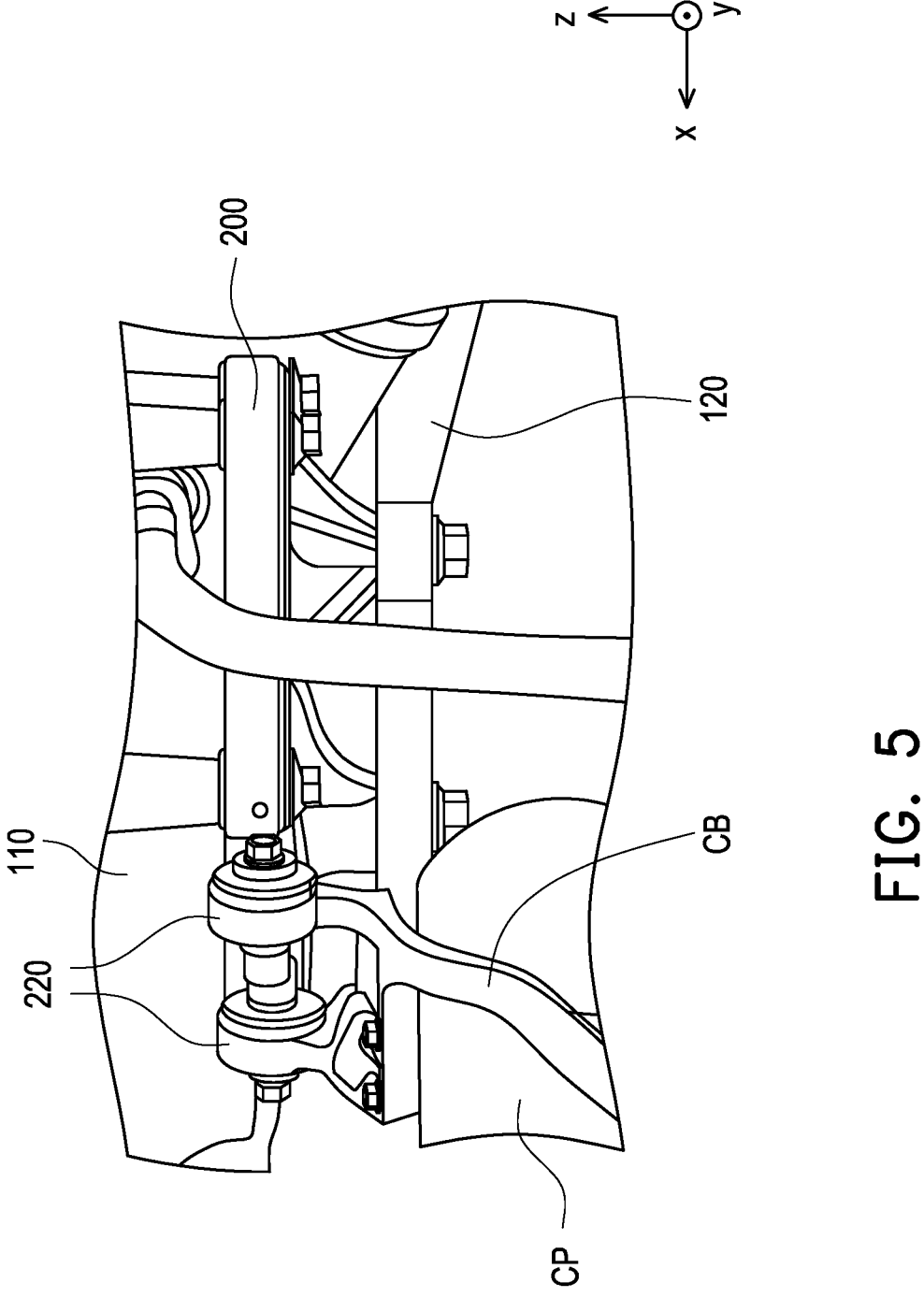

FIG. 5 is a schematic partially enlarged structural view near a compressor fixing part of the fuel cell system structure of FIG. 1A.

DESCRIPTION OF THE EMBODIMENTS

A fuel cell system structure of embodiments of the disclosure exhibits improved layout flexibility.

An embodiment of the disclosure provides a fuel cell system structure. The fuel cell system structure includes a fuel cell driving system which includes: a fuel cell case for accommodating a fuel cell stack and a driving unit for driving a target to be driven; and a connecting member connecting the fuel cell case and the driving unit. The fuel cell case includes an extended part extending from a surface facing the connecting member, and the extended part is fixed on the connecting member.

In an embodiment of the disclosure, the extended part is formed as a collar when the extended part is fastened with the connecting member by a bolt.

In an embodiment of the disclosure, the extended part includes a front extended part and a rear extended part, and the fuel cell case is provided with, between the front extended part and the rear extended part, a pipe connecting part connected with a pipe supplying a gas or a refrigerant to a fuel cell of the fuel cell stack.

In an embodiment of the disclosure, the connecting member includes a protruding part for fixing the driving unit, the extended part and the protruding part are formed by a collar for fastening a bolt, and the extended part and the protruding part are disposed at positions separate from each other.

In an embodiment of the disclosure, the fuel cell system structure further includes: a mounting bracket for mounting the fuel cell case on the target to be driven; and a mounting fixing part for fixing the mounting bracket to the fuel cell case. The mounting fixing part is disposed above the extended part, and the fuel cell case includes a wall part extending from the mounting fixing part to the extended part.

In an embodiment of the disclosure, the connecting member includes a compressor fixing part, and the compressor fixing part fixes a compressor supplying an antioxidant gas to a fuel cell.

Based on the foregoing, in the fuel cell system structure of embodiments of the disclosure, through the configuration of the extended part and the connecting member, it may not be necessary to further expand the volume of the fuel cell case to increase the space for disposing the fixing part, and layout flexibility can be improved accordingly. For example, through the gap between the extended part and the connecting member, a space for the pipe and the pipe connecting part can be provided between the connecting member and the fuel cell case, and interference between the members can be avoided, exhibiting improved layout flexibility. In addition, through forming the extended part and the protruding part as the collar for fastening the bolt, the fuel cell case and the driving unit can be firmly fixed. Besides, since the extended part and the protruding part are disposed at positions separate from each other, the extended part and the protruding part do not interfere with each other when the bolt is inserted, and the assembly is facilitated. Furthermore, through a plurality of fixing points between the connecting member and the fuel cell case, the fixing points can accordingly bear and disperse an external load to ensure the rigidity required by the connecting member. Moreover, through disposing the compressor fixing part of the connecting member, the connecting member may also be used to fix the compressor, which can further integrate and reduce the number of parts for adding other fixing parts.

To make the aforementioned more comprehensible, several embodiments accompanied with drawings are described in detail as follows.

Figure 1B:
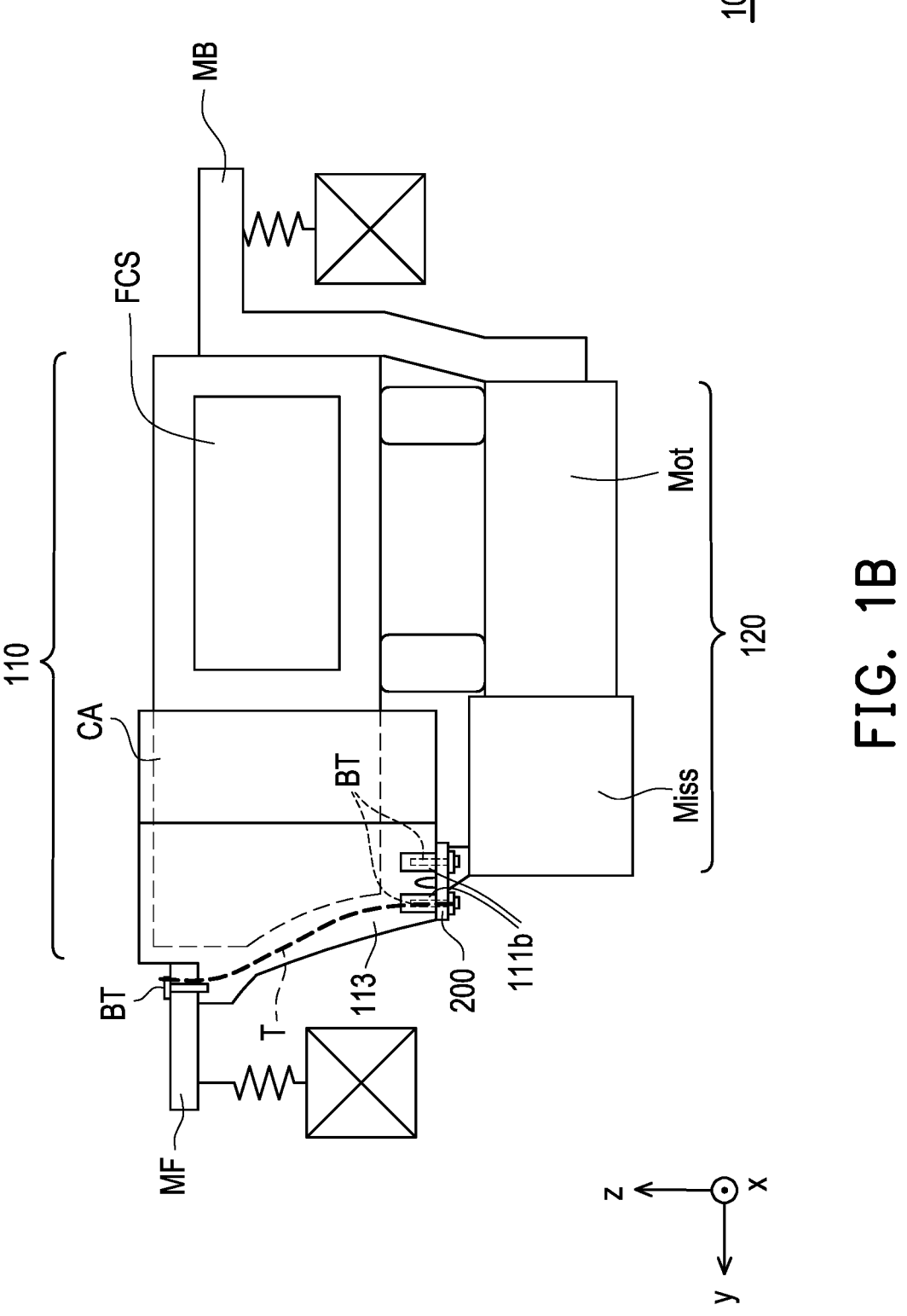
FIG. 1B is a schematic outline of the fuel cell system structure of FIG. 1A viewed from another side.
Figure 2A:
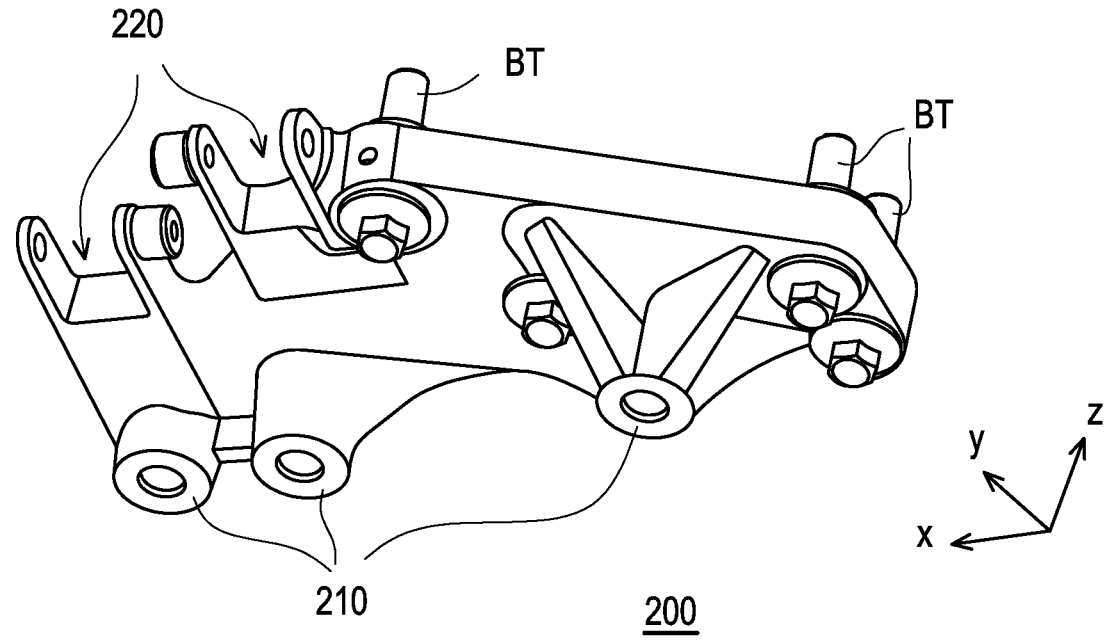
FIG. 2A is a schematic perspective view of a connecting member of FIG. 1A.
Figure 2B:
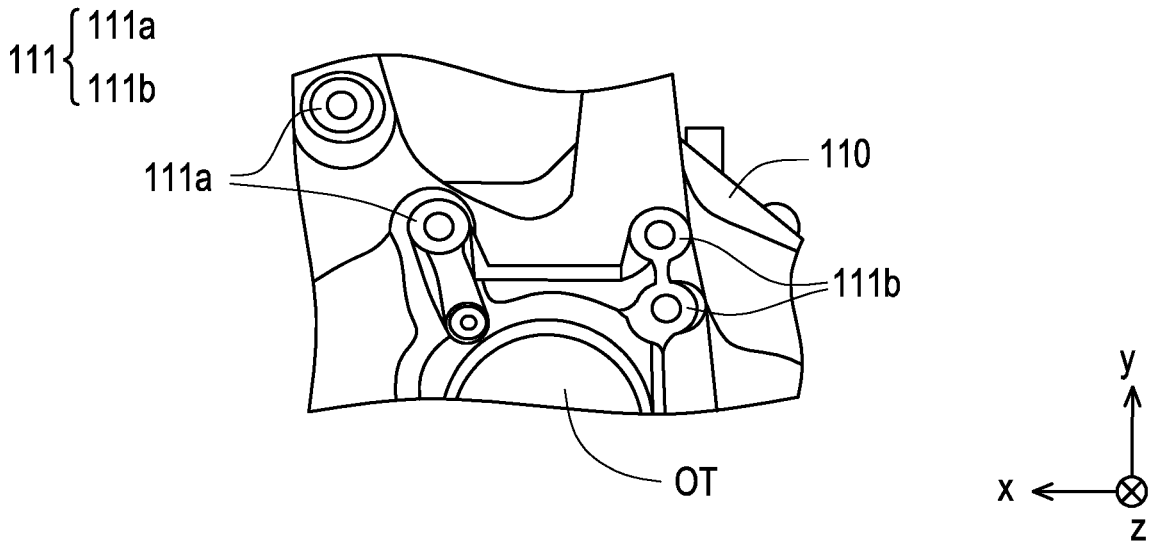
FIG. 2B is a schematic bottom view of an extended part of a fuel cell case of FIG. 1A.
Figure 3:
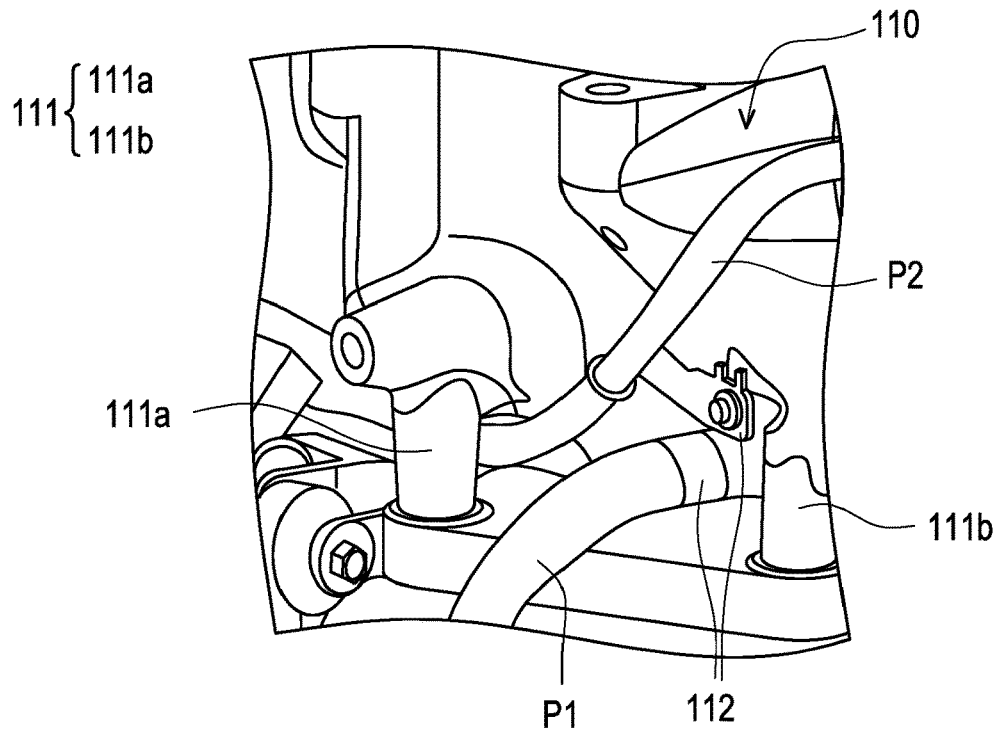
FIG. 3 is a schematic partially enlarged structural view near a pipe connecting part of the fuel cell system structure of FIG. 1A.
Figure 4:
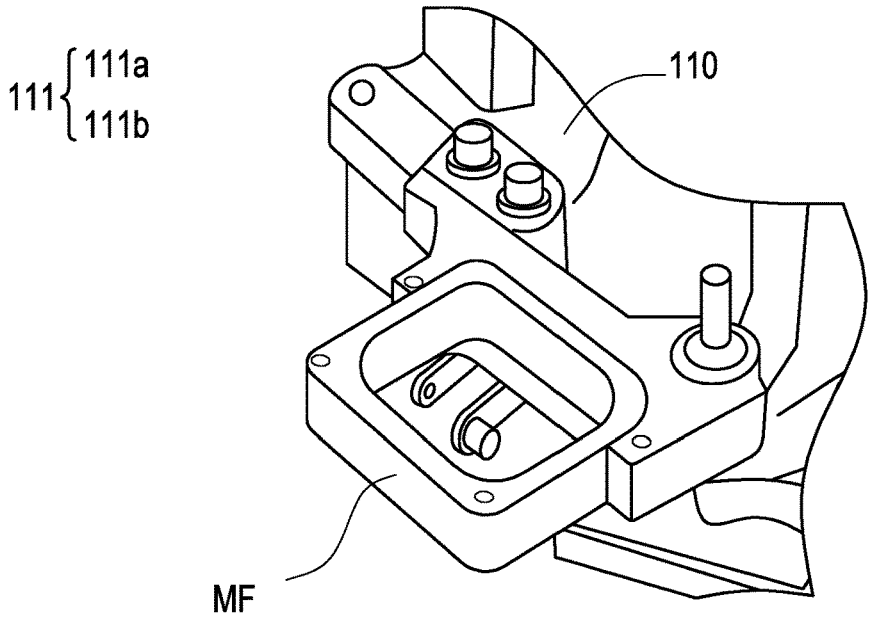
FIG. 4 is a schematic partially enlarged structural view of a mounting bracket of the fuel cell system structure of FIG. 1A.

FIG. 1A is a schematic outline of a fuel cell system structure viewed from one side according to an embodiment of the disclosure. FIG. 1B is a schematic outline of the fuel cell system structure of FIG. 1A viewed from another side. FIG. 2A is a schematic perspective view of a connecting member of FIG. 1A. FIG. 2B is a schematic bottom view of an extended part of a fuel cell case of FIG. 1A. FIG. 3 is a schematic partially enlarged structural view near a pipe connecting part of the fuel cell system structure of FIG. 1A. FIG. 4 is a schematic partially enlarged structural view of a mounting bracket of the fuel cell system structure of FIG. 1A. FIG. 5 is a schematic partially enlarged structural view near a compressor fixing part of the fuel cell system structure of FIG. 1A.

With reference to FIG. 1A to FIG. 5, in this embodiment, a fuel cell system structure 10 includes a fuel cell driving system 100 and a connecting member 200. The fuel cell driving system 100 includes a fuel cell case 110 for accommodating a fuel cell stack FCS and a driving unit 120 for driving a target to be driven. The driving unit 120 includes a motor MOT and a transmission unit MISS. In this embodiment, the target to be driven is, for example, a vehicle, but the disclosure is not limited thereto. In other embodiments, the target to be driven may also be other electronic devices that require to be equipped with the fuel cell driving system 100. For example, as shown in FIG. 1A to FIG. 5, in this embodiment, an x direction is a front-rear direction of a vehicle, a y direction is a width direction of the vehicle, and a z direction is a height direction of the vehicle.

Specifically, as shown in FIG. 1B, in this embodiment, the fuel cell case 110 includes a protective cover CA. The protective cover CA may be used as a cover for a pipe P that provides a reaction gas that flows into the fuel cell stack FCS to provide high-strength protection to the relevant parts of the pipe P where the reaction gas flows.

Further, as shown in FIG. 1A to FIG. 2B, in this embodiment, the connecting member 200 connects the fuel cell case 110 and the driving unit 120. More specifically, the fuel cell case 110 includes an extended part 111 extending from a surface facing the connecting member 200, and the extended part 111 is fixed on the connecting member 200. As such, since the extended part 111 for fixing the fuel cell case 110 is extended in the vertical direction and fixed on the connecting member 200, it may not be necessary to further expand the volume of the fuel cell case 110 to increase the space for disposing the fixing part, and layout flexibility can be improved accordingly.

Specifically, as shown in FIG. 1A, FIG. 2B, and FIG. 3, in this embodiment, the extended part 111 includes a front extended part 111a and a rear extended part 111b. The fuel cell case 110 is provided with a pipe connecting part 112 between the front extended part 111a and the rear extended part 111b. The pipe connecting part 112 is connected with a pipe P1 supplying a gas to a fuel cell of the fuel cell stack FCS or a pipe P2 supplying a refrigerant to the fuel cell of the fuel cell stack FCS. Furthermore, as shown in FIG. 2B, in this embodiment, the extended part 111 of the fuel cell case 110 is fixed on the connecting member 200 of the driving unit 120, and is located, in the width direction of the vehicle (i.e., the y direction), at an outer side with respect to a discharging port OT from which the exhaust gas and the generated water after the power generation reaction of the fuel cell are discharged. As such, through the gap formed between the extended part 111 and the connecting member 200, a space for the pipe P and the pipe connecting part 112 can be provided between the connecting member 200 and the fuel cell case 110, and interference between the members can be avoided, exhibiting improved layout flexibility.

In addition, as shown in FIG. 1A to FIG. 2B, in this embodiment, the extended part 111 is formed as a collar when the extended part 111 is fastened with the connecting member 200 by a bolt BT. As such, the fuel cell case 110 can be firmly fixed. Furthermore, as shown in FIG. 1A and FIG. 2A, in this embodiment, the connecting member 200 includes a protruding part 210 for fixing the driving unit 120. The protruding part 210 may also be formed by a collar for fastening the bolt BT, and the extended part 111 and the protruding part 210 are disposed at positions separate from each other. As such, the fuel cell case 110 and the driving unit 120 can be firmly fixed at the same time. Moreover, since the extended part 111 and the protruding part 210 are disposed at positions separate from each other, the extended part 111 and the protruding part 210 do not interfere with each other when the bolt BT is inserted, and the assembly is facilitated.

Moreover, as shown in FIG. 1A, in this embodiment, during acceleration of the vehicle, a load is likely to be generated in a direction C in which the fuel cell case 110 revolves backward about the center of gravity. In the above-mentioned structure, through a plurality of fixing points (e.g., the extended part 111 and/or the protruding part 210) between the connecting member 200 and the fuel cell case 110, the fixing points can accordingly bear and disperse the load to ensure the rigidity required by the connecting member 200. In addition, as shown in FIG. 1A, FIG. 1B, and FIG. 4, in this embodiment, the fuel cell system structure 10 further includes a mounting bracket MB and a mounting fixing part MF. The mounting bracket MB is for mounting the fuel cell case 110 on the target to be driven, and the mounting fixing part MF is for fixing the mounting bracket MB to the fuel cell case 110. The mounting fixing part MF is disposed above the extended part 111. The fuel cell case 110 includes a wall part 113 extending from the mounting fixing part MF to the extended part 111. As such, the wall part 113 may also form a transfer path T of the load. The load from the mounting bracket MB and the mounting fixing part MF can be transferred to the extended part 111 and dispersed, so that the fuel cell case 110 and the connecting member 200 connected thereto can bear the external load.

In addition, as shown in FIG. 5, in this embodiment, the connecting member 200 further includes a compressor fixing part 220. The compressor fixing part 220 fixes a compressor CP supplying an antioxidant gas to the fuel cell through a compressor holder CB. As such, the connecting member 200 can also be used to fix the compressor CP, which can further reduce the number of parts for adding other fixing parts.

In summary of the foregoing, in the fuel cell system structure of embodiments of the disclosure, through the configuration of the extended part and the connecting member, it may not be necessary to further expand the volume of the fuel cell case to increase the space for disposing the fixing part, and layout flexibility can be improved accordingly. For example, through the gap between the extended part and the connecting member, a space for the pipe and the pipe connecting part can be provided between the connecting member and the fuel cell case, and interference between the members can be avoided, exhibiting improved layout flexibility. In addition, through forming the extended part and the protruding part as the collar for fastening the bolt, the fuel cell case and the driving unit can be firmly fixed. Besides, since the extended part and the protruding part are disposed at positions separate from each other, the extended part and the protruding part do not interfere with each other when the bolt is inserted, and the assembly is facilitated. Furthermore, through a plurality of fixing points between the connecting member and the fuel cell case, the fixing points can accordingly bear and disperse an external load to ensure the rigidity required by the connecting member. Moreover, through disposing the compressor fixing part of the connecting member, the connecting member may also be used to fix the compressor, which can further integrate and reduce the number of parts for adding other fixing parts.

What is claimed is:

1. A fuel cell system structure comprising:

a fuel cell driving system comprising: a fuel cell case for accommodating a fuel cell stack and a driving unit for driving a target to be driven; and a connecting member connecting the fuel cell case and the driving unit, wherein the fuel cell case comprises an extended part extending from a surface facing the connecting member, and the extended part is fixed on the connecting member, and the connecting member comprises a protruding part for fixing the driving unit, the extended part and the protruding part are formed by a collar for fastening a bolt, and the extended part and the protruding part are disposed at positions separate from each other.

2. The fuel cell system structure according to claim 1, wherein the extended part is formed as a collar when the extended part is fastened with the connecting member by a bolt.

3. The fuel cell system structure according to claim 1, wherein the extended part comprises a front extended part and a rear extended part, and the fuel cell case is provided with, between the front extended part and the rear extended part, a pipe connecting part connected with a pipe supplying a gas or a refrigerant to a fuel cell of the fuel cell stack.

4. The fuel cell system structure according to claim 1, further comprising:

a mounting bracket for mounting the fuel cell case on the target to be driven; and a mounting fixing part for fixing the mounting bracket to the fuel cell case, wherein the mounting fixing part is disposed above the extended part, and the fuel cell case comprises a wall part extending from the mounting fixing part to the extended part.

5. The fuel cell system structure according to claim 1, wherein the connecting member comprises a compressor fixing part, and the compressor fixing part fixes a compressor supplying an antioxidant gas to a fuel cell.

* * * * *